June 9, 1964     J. D. RICHARD     3,136,577
SEAT TEMPERATURE REGULATOR
Filed Aug. 2, 1961     2 Sheets-Sheet 1
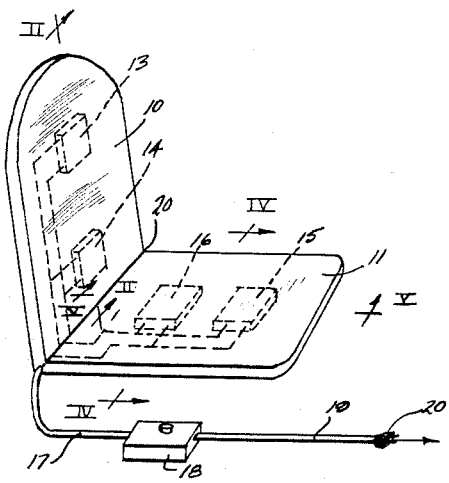
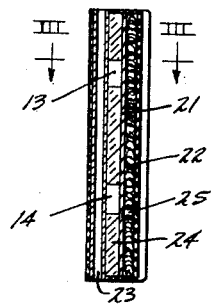
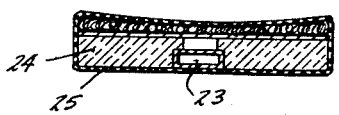
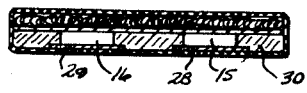
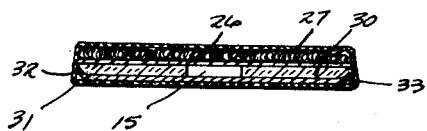
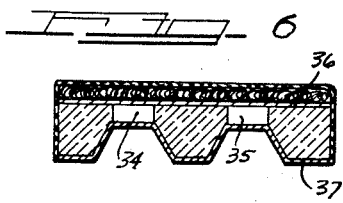
INVENTOR.
Joseph D. Richard
BY
*Kill, Sherman, Meroni, Gross & Simpson*
ATTORNEYS June 9, 1964  J. D. RICHARD  3,136,577
SEAT TEMPERATURE REGULATOR
Filed Aug. 2, 1961  2 Sheets-Sheet 2
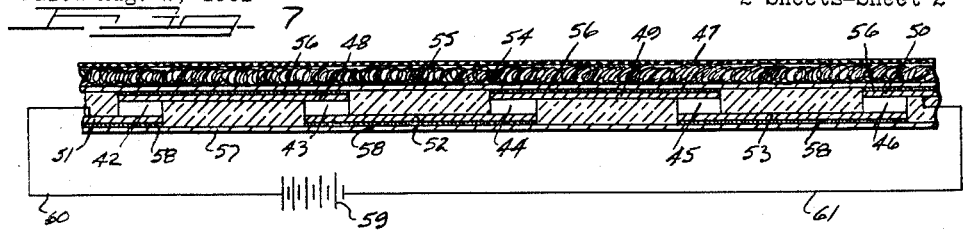
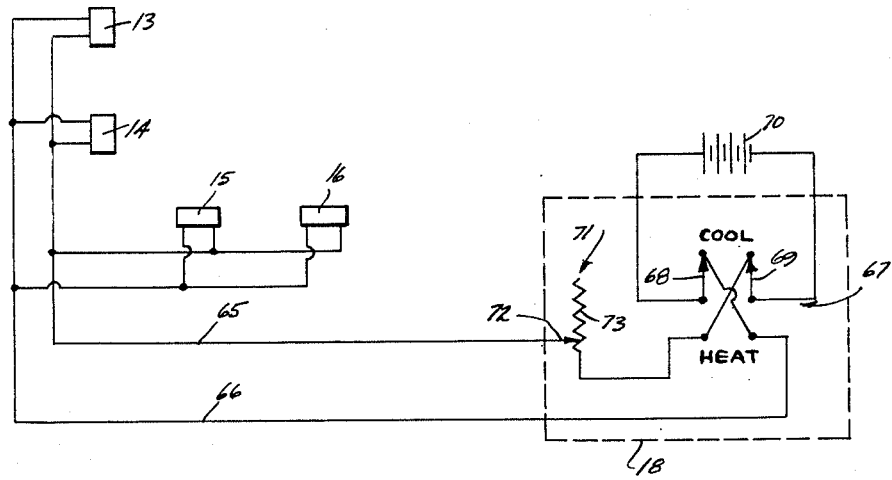
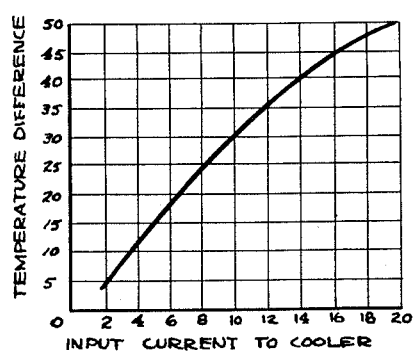
INVENTOR.
Joseph D. Richard
BY
*Hill, Sherman, Meroni, Gross & Simpson*
ATTORNEYS United States Patent Office 3,136,577
Patented June 9, 1964

3,136,577
SEAT TEMPERATURE REGULATOR
Joseph D. Richard, 531 S. Barrancas Ave., Warrington, Fla., assignor, by direct and mesne assignments, of fifty-five percent to Stevenson P. Clark, Coconut Grove, Fla., and twenty percent to Dorothy S. Clark, Northbrook, Ill.
Filed Aug. 2, 1961, Ser. No. 128,864
9 Claims. (Cl. 297—180)

This invention relates to temperature regulating devices and, more particularly, to an electric temperature regulator that is designed to control the temperature of the portions of an individual in contact with a seat. The invention contemplates providing an apparatus and method for comforting an individual, such as in an automobile, by a seat pad with a surface cooled by thermoelectric elements operating in accordance with the Peltier effect.

As is well known, providing adequate cooling for an individual in a warm climate and heat in a relatively cool climate has always presented considerable difficulty, and various devices have been devised to remedy this situation. In the instance where the ambient temperature is relatively hot and it is desired to provide cooling, the best known means is to provide ventilation. This is not ordinarily adequate, however, because ventilation provides cooling only when the ventilating medium is at a lower temperature than the object being ventilated. Ventilation will also provide cooling when the air is drier than 100% humidity and the ventilated object is moist due to the cooling effect of evaporation. As previously stated, however, this method is usually inadequate because it does not provide cooling when it is needed most i.e., during warm periods of high humidity and during periods of very hot ambient temperatures.

In recent years air conditioners have brought considerable relief since they are able to both lower the humidity and the temperature in a compartment or area but their effectiveness is generally limited to closed compartments which are well insulated and kept closed over considerable periods of time. They have not proved to be adequate, however, when they are installed in automobiles for numerous reasons. For example, they are quite noisy and produce vibration, consume considerable amounts of power, and are considerably expensive. For salesmen and the like air conditioning is of dubious value; because of the air conditioner's high current drain it must be shut off each time the car is stopped, and if a car is parked with the windows up and the air conditioning turned off the inside of the car will be hot once again within a few minutes. At least five minutes is required after starting the car for the interior of the car to cool off again. A still further disadvantage in having an air conditioner in a car is the fact that the automobile windows must be kept closed while driving. This not only deprives the occupants of the car of fresh air but in areas of the world where hand signals are mandatory, which in fact is nearly everywhere outside of the United States, the driver of the automobile must be continuously running his window up and down each time he intends to change the course of the automobile.

It is a physiological fact that a person feels cool when his back is cool. This is probably due to the fact that the central portion of the spinal cord plays an important part in an individual's nervous system. It is also a physiological fact that there is a general sensation of being cool as long as heat is being removed from the body, such as when wind blows over wet skin. This sensation of being cool is felt as long as heat is being removed from the body at a moderate rate.

The foregoing observations also apply to the instance where a heating effect is to be produced rather than a cooling effect. This points up another disadvantage of conventional air conditioners which is that they are able to provide only a cooling effect and are not designed to produce heat as well.

Accordingly, it is a general object of this invention to provide an electric temperature regulator that is capable of providing either a heating or a cooling sensation on selected portions of an individual's body.

It is another object of this invention to provide a temperature regulator that is especially adapted for use in automobiles.

It is still another object of this invention to provide an electric temperature regulator that is able to provide either a heating or a cooling effect.

It is yet another object of this invention to provide a temperature regulator that is portable and is adapted to be used in connection with any seat or chair desired.

These and other objects of the invention are attained by providing a temperature regulator apparatus that is especially adapted for use in automobiles which comprises at least one cushion that has a plurality of thermoelectric elements having first and second junctions, first and second heat distributing means connected to the first and second junctions, respectively, the first heat distributing means being a thermal conductor which is shaped as a cushion for supporting an individual and transferring heat closely adjacent to the individual, and the second heat distributing means also being a good heat conductor and being adapted to transfer heat to a distance from the individual.

This invention may be better understood and other objects, features, and advantages may be more apparent from the following detailed description taken in conjunction with the accompanying figures of the drawings, wherein like reference numerals refer to like parts, in which:

FIGURE 1 is a perspective view of a temperature regulator apparatus constructed in accordance with the invention;

FIGURE 2 is a sectional view taken along the line II—II of FIGURE 1;

FIGURE 3 is a sectional view taken along the line of III—III of FIGURE 2;

FIGURE 4 is a sectional view taken along the line IV—IV of FIGURE 1;

FIGURE 5 is a sectional view taken along the line V—V of FIGURE 1;

FIGURE 6 is a sectional view showing an alternative construction of the invention;

FIGURE 7 is a sectional view showing another alternative construction of the invention;

FIGURE 8 is a schematic diagram of the electrical circuit for a temperature regulator constructed in accordance with the invention; and FIGURE 9 is a curve illustrating the characteristics of a thermoelectric element used in this invention.

The Peltier effect has been known for many years and may be generally stated as follows: When an electric current flows across the junction between two different metals, a quantity of heat, proportional to the total charge crossing the junction, is evolved or absorbed, depending on the direction of current. This effect is due to the existence of an electromotive force at the junction of the two metals.

Certain semiconductor materials have recently been developed which are very efficient in producing a heating or cooling effect in accordance with these principles, for example, the material Neelium which is an alloy of bismuth, tellurium, antimony and selenium. Thermoelectric elements using materials such as this are now readily available on the market. For example, "Frigistor" is sold by Needco, and Spot Cooler Model 10 is sold by Minnesota Mining and Manufacturing Company; similar cooling and heating elements are sold by Westinghouse and other corporations.

While temperature regulator structures constructed in accordance with this invention are especially adapted to control the temperature in an automobile, and will be hereinafter specifically described in connection with such usage, it should be understood that the temperature regulators are capable of use with other types of chairs, and that the invention is not limited to any particular usage.

As shown on the drawings:

With specific reference to FIGURE 1, there is illustrated a portable temperature regulator apparatus constructed in accordance with the invention which includes a backrest 10 and a seat cushion 11 which are hinged together by a flexible coupling 12. Mounted within the backrest 10 are two thermoelectric elements 13 and 14 and mounted within the seat cushion 11 are two similar elements 15 and 16. These four elements 13–16 are electrically connected in parallel to a power input line 17 that leads to a manual control 18. The control unit 18 in turn is connected to a conventional direct current power supply by a line 19 and a conventional connector 20.

An apparatus of the type illustrated in FIGURE 1 is operated by connecting the connector 20 to a direct current power supply and placing the control unit 18 in one of its three positions. This control unit 18 may be a conventional double-pole double-throw center off switch which is connected to permit current flow in a first direction through the thermoelectric elements when it is in one of its on positions and to permit current flow in the opposite direction through the thermoelectric elements when it is in its other on position. Depending upon the setting of the unit 18 and the direction of current flow, a person sitting on the seat cushion 11 with his back against the backrest 10 will experience either a heating or a cooling effect which is produced by the thermoelectric elements 13–16.

FIGURES 2–5 illustrate the manner in which the thermoelectric elements are mounted in the portable temperature regulator apparatus illustrated in FIGURE 1. FIGURES 2 and 3 are sectional views of the backrest 10, which includes the two thermoelectric elements 13 and 14, a thin metal plate 21 which is preferably curved to fit the back of an individual, a layer 22 of a resilient heat conductor material such as copper wool, a vertically extending tube 23, and a relatively thick layer of thermal insulation 24. The entire assembly is enclosed in a porous fabric cover 25.

The metal plate 21 is attached to one junction of the thermoelectric elements 13 and 14 and the tube 23 is attached to the other junction of the elements. If the direction of current flow through the elements 13 and 14 is such that a cooling effect is produced at the junction attached to the plate 21, this plate will act to distribute the cooling effect over the entire front portion of the backrest. In these circumstances the hot junction of the elements 13 and 14 is attached to the tube 23 which acts to remove the heat being produced from the vicinity of the individual. The tube 23 is made flat and hollow so that air can circulate through it and heat is removed by convection. The air circulates from the bottom, as seen in FIGURE 2, through the tube 23 and out of the top of the tube. The layer of insulation 24 separates the metal plate 21 from the tube 23 and makes the apparatus more efficient. The layer 22 of resilient heat conducting material makes the apparatus more comfortable for an individual in addition to further distributing the cooling effect being produced.

In the event the direction of current flow through the thermoelectric elements 13 and 14 is in the opposite direction so that a heating effect is produced at the junctions attached to the plate 21, the operation of the apparatus is the opposite of that previously described.

The consruction of the seat cushion 11 is illustrated in FIGURES 4 and 5. It includes the two thermoelectric elements 15 and 16, a thin metal plate 26 which may be curved to fit the individual, a layer 27 of a resilient heat conductor material such as copper wool, two metal strips 28 and 29 which are attached to the elements 15 and 16, respectively, and a relatively thick layer of thermal insulation 30. Once again, the entire assembly may be covered by a porous fabric cover 31. The two metal strips 28 and 29 run across the width of the seat cushion 11 and their end portions 32 and 33 are curved upwardly, as shown in FIGURE 4.

Again assuming the operation wherein a cooling effect is to be produced, the cold junctions of the elements 15 and 16 are connected to the plate 26 and the cooling effect is distributed over the entire upper area of the seat cushion. The heat produced by the two hot junctions of the elements 15 and 16 is carried away by the two strips 28 and 29. Some of this heat is dissipated in the seat of the automobile while the remainder of the heat is dissipated in the air by the two curved end portions 32 and 33 of these two strips.

In FIGURE 6 is illustrated a permanently mounted temperature regulator apparatus which again may be mounted in an automobile seat. In the embodiment of the invention illustrated, there is included two thermoelectric elements 34 and 35 which have one junction attached to a metal plate 36. The other junctions of the elements 34 and 35 are connected to a thick metal strip 37 which serves both as a support and as a heat conductor. Heat is conducted from this metal plate 37 to and from the elements 34 and 35 from the undersurface of the seat cushion, and this plate is corrugated or folded to place a greater distance between the metal plates attached to the hot and cold junctions.

The construction illustrated in FIGURE 6 may be employed for both the seat cushion 11 and the backrest 10 or for the seat cushion 11 only. In the latter event, the construction illustrated in FIGURES 2 and 3 may be employed for the backrest 10.

The construction illustrated in FIGURE 7 is especially useful where a relatively large number of thermoelectric elements are necessary. This construction includes thermoelectric elements 42–46 and a plurality of copper strips 48–53. The strips electrically connect the elements 42–46 in series with a direct current power supply such as a battery 59, and the elements are arranged so that all of their junctions facing the upper side of the seat as seen in FIGURE 7 produce a cooling effect when the current flows in a first direction through them.

The copper strips 48, 49 and 50 fastened to the upper junctions of the elements as seen in FIGURE 7 are placed in thermal contact with a layer 55 of a good heat transfer material by an electrically insulating, thermally conductive adhesive 56. As an alternative, the strips 48, 49 and 50 may be fastened to the layer 55 by other means such as riveting and a material such as epoxy resin, silicone grease, etc. may be inserted between the layer 55 and the strips to obtain good thermal contact for least resistance to heat flow. The copper strips 51–53 attached to the lower junctions as seen in FIGURE 7 of the elements are similarly attached to a layer 57 of a heat transfer material by an adhesive 58.

If desired, a layer 54 of copper wool and a fabric 47 may be disposed over the layer 55.

The battery 59 shown in FIGURE 7 is suitably attached to the end copper strips 51 and 53 by two conductors 60 and 61 which connect to suitable terminals.

The electrical connections to the the thermoelectric elements 13–16 illustrated in FIGURE 1 are illustrated schematically in FIGURE 8. The four thermoelectric elements are preferably connected in parallel so that they will all have the same voltage applied across them and, in the event one of the elements fails, the remaining three elements will still be operative. The four elements are connected by two conductors 65 and 66 to the manual control unit 18. This unit includes a manually operable double-pole double-throw center off switch 67 which has one position marked "cool" and its other position marked "heat." The movable contacts 68 and 69 of the switch are connected across a conventional direct current power supply such as a battery 70 and the stationary contacts are connected through a variable resistor 71 to the conductors 65 and 66 and the thermoelectric elements. This variable resistor 71 includes a sliding contact 72 which is manually adjusted to set the amount of current flowing to the thermoelectric elements. The variable resistor 71 is a conventional high wattage type and the value of its resistive element 73 will be determined in practice by the rated value of the direct current power supply 70 and the rating of the thermoelectric elements 13–16. In the event a standard six volt automobile battery is being used, the variable resistor 71 may be adjustable between 0 and 10 ohms when used with standard thermoelectric elements.

In FIGURE 9 is illustrated the typical thermal and electrical characteristics for Westinghouse thermoelectric coolers types WX814–H and WX816–H. This curve illustrates temperature difference in degrees centigrade versus input current in amperes for a constant heat pumping load. As can be seen from this curve, the characteristic of these two coolers is nearly linear with current variation over the range illustrated, and the temperature difference ranges from nearly 0 up to nearly 50° C.

The operation of any of the embodiments of the invention illustrated may also be made completely automatic if desired. A temperature responsive device of the type employed in a conventional thermostat may be installed in the apparatus, for example between the layer 22, FIGURE 2, and the cover 25 and be connected to control the position of the switch 67 in the control unit 18. In this alternative construction the control unit 18 would include simply an on-off switch and a dial which would permit the operator to select a desired temperature range. The automatic control would then turn the switch 67 to permit current flow in a first direction in the event the temperature fell below the selected range and to permit current flow in the opposite direction in the event the temperature rose above this selected range.

It is apparent that a novel and useful temperature regulator apparatus has been provided. The portable regulator apparatus may be employed in an automobile and be powered by the automobile battery. In this instance, the connector 20 could be designed to plug into the standard cigarette lighter in the automobile. The apparatus can produce either a cooling or a heating effect by simply reversing the direction of current flow and the amount of cooling or heating being produced can be controlled from zero to maximum by a simple variable resistor which is connected in series with the thermoelectric elements.

An apparatus constructed in accordance with this invention, either portable or permanent, is especially suitable for use in automobiles. The windows of the automobile may be either open or closed during operation which, of course, has many advantages. Further, the apparatus is capable of providing a cooling effect without noise or vibration. Relatively low amounts of power would be required in operation since no attempt is made to cool the entire inside of the car; only the portion around the occupants. The portable apparatus has the further advantage that, in addition to use in an automobile, it can be used in nearly any environment where electrical power is available. In the event only an alternating current outlet is available, a simple and inexpensive A.C. to D.C. converter can be used in conjunction with the apparatus.

The invention also contemplates the construction whereby the thermoelectric elements are permanently built into the seats. They can be built into automobile seats in conformance with the invention, office chairs, etc. In other words, the invention provides an apparatus and method for comforting an individual by placing a surface cooled or heated by thermoelectric element operating under the Peltier effect close to a portion of the body of the individual.

It will be apparent that modifications and variations may be effected without departing from the scope of the novel concepts of the present invention, and it will be understood that this application is to be limited only by the scope of the appended claims.

I claim as my invention:

1. A temperature regulator apparatus especially adapted to be used in an automobile comprising a plurality of thermoelectric elements which operate in accordance with the Peltier effect, said thermoelectric elements having first and second junctions, first and second heat distributing means coupled to said first and second junctions, respectively, said first heat distributing means being shaped as a cushion for an individual and said second heat distributing means being adapted to transfer heat away from the individual, control means electrically connected to said plurality of thermoelectric elements, said control means including a variable resistance element which is adapted to vary the quantity of current flowing through said thermoelectric elements and a switch for reversing the direction of current flow through said elements.

2. A portable temperature regulator apparatus especially adapted for use in automobiles comprising a backrest and a seat cushion which are hinged together by a flexible coupling, at least first and second thermoelectric elements mounted in said backrest and at least third and fourth thermoelectric elements mounted in said seat cushion, said thermoelectric elements operating in accordance with the principles of the Peltier effect and having first and second junctions, said backrest including a first plate of thermally conductive material which is connected to said first junctions of said first and second thermoelectric elements, a first layer of resilient thermally conductive material covering said first plate, a relatively flat hollow open-ended tube connected to said second junctions of said first and second thermoelectric elements, said tube being made of a thermally conductive material, thermal insulation separating said tube from said first plate, said set cushion including a second plate made of thermally conductive material which is connected to said first junctions of said third and fourth thermoelectric elements, third and fourth plates made of thermally conductive material connected to said second junctions of said third and fourth thermoelectric elements, respectively, thermal insulation separating said second plate from said third and fourth plate, a layer of resilient thermally conductive material covering said second plate, and means electrically connecting said four thermoelectric elements in parallel.

3. A portable temperature regulator apparatus especially adapted for use in automobiles comprising a backrest and a seat cushion which are hinged together by a flexible coupling, at least first and second thermoelectric elements mounted in said backrest and at least third and fourth thermoelectric elements mounted in said seat cushion, said thermoelectric elements operating in accordance with the principles of the Peltier effect and having first and second junctions, said backrest including a first plate of thermally conductive material which is connected to said first junctions of said first and second thermoelectric elements, a first layer of resilient thermally conductive material covering said first plate, a relatively flat hollow open-ended tube connected to said second junctions of said first and second thermoelectric elements, said tube being made of a thermally conductive material, thermal insulation separating said tube from said first plate, said seat cushion including a second plate made of thermally conductive material which is connected to said first junctions of said third and fourth thermoelectric elements, third and fourth plates made of thermally conductive material connected to said second junctions of said third and fourth thermoelectric elements, respectively, thermal insulation separating said second plate from said third and fourth plate, a layer of resilient thermally conductive material covering said second plate, means electrically connecting said four thermoelectric elements in parallel, said last named means including a control unit which has a variable resistor to vary the magnitude of current flow through said four thermoelectric elements and a switch which is adapted to reverse the direction of current flow through said four thermoelectric elements.

4. A portable seat comprising in combination a backrest member, a seat member connected along its rear edge to said backrest member, thermoelectric elements in each of said members operating in accordance with the principles of the Peltier effect with said element having first and second junctions, said first junctions being connected to a plate of thermally conductive material on the upper surfaces of the members, the second junctions being located adjacent the back surfaces of the members.

5. A portable seat comprising in combination a backrest member, a seat member connected along its rear edge to said backrest member, thermoelectric elements in each of said members operating in accordance with the principles of the Peltier effect with said element having first and second junctions, said first junctions being connected to a plate of thermally conductive material on the upper surfaces of the members, the second junctions being located adjacent the back surfaces of the members, and a porous fabric cover over said thermally conductive material.

6. A portable seat assembly comprising in combination a backrest member and a seat member connected to the back member along one edge, thermoelectric elements in said members having first and second junctions and operating in accordance with the principles of the Peltier effect, said first junctions being closer to the upper surfaces of said members and said second junctions being closer to the undersurface of said members, and an elongated open-ended hollow air conducting tubular means in heat conducting relationship with one of said junctions for accommodating the circulation of air and removal of heat from the junctions.

7. A portable seat comprising a backrest member and a seat member connected thereto, at least one of said members having thermoelectric elements embedded therein operating in accordance with the principles of the Peltier effect with a first junction adjacent the upper surface of the member and a second junction adjacent the lower surface of the member, open-ended hollow tubes in heat transfer relationship with the second junctions, and a layer of heat conducting material in heat transfer relationship with the first junctions.

8. A portable seat comprising a backrest member and a seat member connected thereto, said backrest member having at least one thermoelectric element embedded therein operating in accordance with the principles of the Peltier effect with a first junction adjacent one surface of the backrest member and a second junction adjacent another surface of said backrest member, a layer of non-resilient heat conducting material overlying said first junction and in heat transfer relationship therewith to provide substantial uniformity of temperature across the backrest member, a layer of resilient heat conductive material overlying said non-resilient layer and in heat transfer relationship therewith to provide comfort while maintaining substantial uniformity of temperature across the backrest member, a hollow open-ended tubular member in heat transfer relationship with said second junction for accommodating the circulation of air therethrough, heat insulating material separating said tubular member and said non-resilient layer and surrounding said element, and a porous material enveloping said backrest member and defining openings at the open ends of said tubular member.

9. A portable seat comprising a backrest member and seat member connected thereto, said seat member having at least one thermoelectric element embedded therein operating in accordance with the principles of the Peltier effect with a first junction adjacent one surface of the seat member and a second junction adjacent another surface of said seat member, a first layer of non-resilient heat conducting material overlying said first junction and in heat transfer relationship therewith to provide substantial uniformity in temperature across said one surface of said seat member, a second layer of resilient heat conducting material overlying said non-resilient layer and in heat transfer relationship therewith to provide comfort while maintaining substantial uniformity of temperature across said one surface of said seat member, and a third layer of heat conducting material overlying said second junction and in heat transfer relationship therewith to provide substantial uniformity of temperature across said second surface of said seat member.

References Cited in the file of this patent

UNITED STATES PATENTS

| | | |
|---|---|---|
| 2,722,266 | Kersten | Nov. 1, 1955 |
| 2,798,494 | Sukacev | July 9, 1957 |
| 2,912,832 | Clark | Nov. 17, 1959 |
| 2,938,356 | McMahon | May 31, 1960 |
| 2,991,627 | Suits | July 11, 1961 |
| 2,992,539 | Curtis | July 18, 1961 |
| 3,030,145 | Kottemann | Apr. 17, 1962 |
| 3,038,049 | Fritts | June 5, 1962 |

FOREIGN PATENTS

| | | |
|---|---|---|
| 271,598 | Switzerland | Feb. 1, 1961 |
| 379,774 | Germany | Aug. 28, 1923 |